(12) United States Patent  (10) Patent No.: US 8,126,409 B2
Osman et al.  (45) Date of Patent: Feb. 28, 2012

(54) ADAPTIVE DELAY ALIGNMENT IN POLAR TRANSMITTERS

(75) Inventors: Saleh Osman, Cupertino, CA (US); Earl W. McCune, Jr., Santa Clara, CA (US)

(73) Assignee: Panasonic Corporation, Osaka (JP)

( * ) Notice: Subject to any disclaimer, the term of this patent is extended or adjusted under 35 U.S.C. 154(b) by 645 days.

(21) Appl. No.: 12/272,037

(22) Filed: Nov. 17, 2008

(65) Prior Publication Data

US 2010/0124889 A1 May 20, 2010

(51) Int. Cl.
*H04L 27/34* (2006.01)
*H03C 1/52* (2006.01)

(52) U.S. Cl. .................. 455/102; 455/127.2; 375/300

(58) Field of Classification Search .................. None
See application file for complete search history.

(56) References Cited

U.S. PATENT DOCUMENTS

| | | | |
|---|---|---|---|
| 4,267,514 A | 5/1981 | Kimsey | |
| 7,027,545 B2 | 4/2006 | Sander | |
| 7,095,353 B2 | 8/2006 | Sander et al. | |
| 7,227,919 B2 | 6/2007 | Sander | |
| 7,263,135 B2 * | 8/2007 | Takabayashi et al. | 375/296 |
| 7,359,680 B2 * | 4/2008 | Klemmer | 455/102 |
| 7,522,676 B2 * | 4/2009 | Matero | 375/295 |
| 7,570,707 B2 * | 8/2009 | Jensen | 375/296 |
| 7,715,808 B2 * | 5/2010 | Shimizu et al. | 455/108 |
| 2008/0205571 A1 * | 8/2008 | Muhammad et al. | 375/376 |
| 2008/0242246 A1 * | 10/2008 | Minnis et al. | 455/127.1 |
| 2008/0261543 A1 * | 10/2008 | Hara et al. | 455/113 |
| 2009/0227273 A1 * | 9/2009 | McCune, Jr. | 455/466 |
| 2010/0291885 A1 * | 11/2010 | Shimizu et al. | 455/102 |

* cited by examiner

*Primary Examiner* — Lincoln Donovan
*Assistant Examiner* — Terry L Englund (57) ABSTRACT

A polar transmitter includes a power amplifier (PA), an amplitude modulation (AM) path including an AM path adjustable delay, an AM path delay measurement circuit, a phase modulation (PM) path including a PM path adjustable delay, and a PM path delay measurement circuit. The AM path delay measurement circuit is configured to measure an AM path delay using waveform correlation, e.g., using peak magnitude events (PMEs) in signals transmitted along the AM path to a power supply port of the PA. The PM path delay measurement circuit is configured to measure a PM path delay using waveform correlation, e.g., using PMEs in signals transmitted along the PM path to a phase-modulated input of the PA. The measured AM and PM path delays are used to adjust the AM and PM path adjustable delays, to reduce the delay mismatch between signals appearing at the power supply and phase-modulated input ports of the polar transmitter's PA.

20 Claims, 9 Drawing Sheets

PRIOR ART

ADAPTIVE DELAY ALIGNMENT IN POLAR TRANSMITTERS

FIELD OF THE INVENTION

The present invention relates to polar transmitters. More specifically, the present invention relates to methods and apparatus for adaptively aligning delays in the amplitude and phase modulation paths of a polar transmitter.

BACKGROUND OF THE INVENTION

To increase the amount of information that can be transmitted in a given bandwidth of the radio frequency (RF) spectrum, i.e., to increase what is referred to in the art as "spectral efficiency," state-of-the-art and evolving wireless communications technologies, such as the Wideband Code Division Multiple Access (W-CDMA) air interface used in third generation (3G) Universal Mobile Telecommunications System (UMTS) cellular networks, and the Evolved UMTS Terrestrial Radio Access (E-UTRA) air interface proposed for use in the fourth generation (4G) Long Term Evolution (LTE) UMTS cellular network upgrade, employ nonconstant-envelope modulation schemes.

Although more spectrally efficient than constant-envelope modulation schemes, nonconstant-envelope modulation schemes require that the output power of conventional communications transmitters (i.e., those transmitters based on quadrature modulators) to be backed off in order to prevent signal distortion. Failure to back-off the power causes the peaks of the nonconstant-envelope signals to be undesirably clipped. The resulting distortion reduces the modulation accuracy of the transmitter and makes it difficult to comply with communications standards and governmental regulations.

Power back-off in a transmitter is achieved by biasing the transmitter's power amplifier (PA) so that the PA is forced to operate in its linear region of operation for the full range of output powers the PA must be configured to operate. In a typical transmitter design, this is achieved by biasing the PA so that its peak output power does not exceed the PA's 1-dB compression point, which defines the input power at which the gain of the PA drops by 1 dB from its ideal, linear response value. The degree of power back-off required depends on the peak-to-average ratio (PAR) of the nonconstant-envelope signals applied to the input of the PA. The PAR is determined by the modulation scheme being used. The higher the PAR, the more the output power of the PA must be backed off. For example, for a PAR of 3 dB, an average power of 10 dBm and a peak output power of 13 dBm, a linear PA response requires that the average output power of the PA be backed off by at least 3 dB in order for the peak output power not to exceed the 1-dB compression point.

Employing power back-off does help to ensure PA linearity. However, it also undesirably results in a significant reduction in energy efficiency. The energy efficiency of a transmitter is determined in large part by how efficient the transmitter's PA is, since the PA is usually the most energy-consuming component of the transmitter. The efficiency of a PA is defined as the ratio of the PA RF output power to the direct current (DC) power supplied to the PA. Efficiency is therefore high when the PA is operating at a high RF output power, but low when the PA is operating at low RF output powers. In most any practical application, the PA operates at high or peak RF output powers only for very short periods of time. For all other times, the RF output power is backed off and the efficiency of the PA is, as a consequence, substantially lowered.

The low energy efficiency of conventional quadrature-modulator-based transmitters is a major problem, particularly in mobile handset applications since the transmitter and its PA are powered by a battery. Fortunately, a more efficient type of communications transmitter, known as a polar transmitter, is available. In a polar transmitter, the amplitude information (i.e., the signal envelope) is temporarily removed from the nonconstant-envelope signal so that the polar transmitter's PA can be operated in its nonlinear region, where it is more efficient at converting energy from the transmitter's power supply into RF power than it is when configured to operate in its linear region. As explained in more detail below, the signal envelope is restored at the output of the PA by dynamically controlling the PA's power supply according to amplitude variations in the signal envelope.

Figure 1:
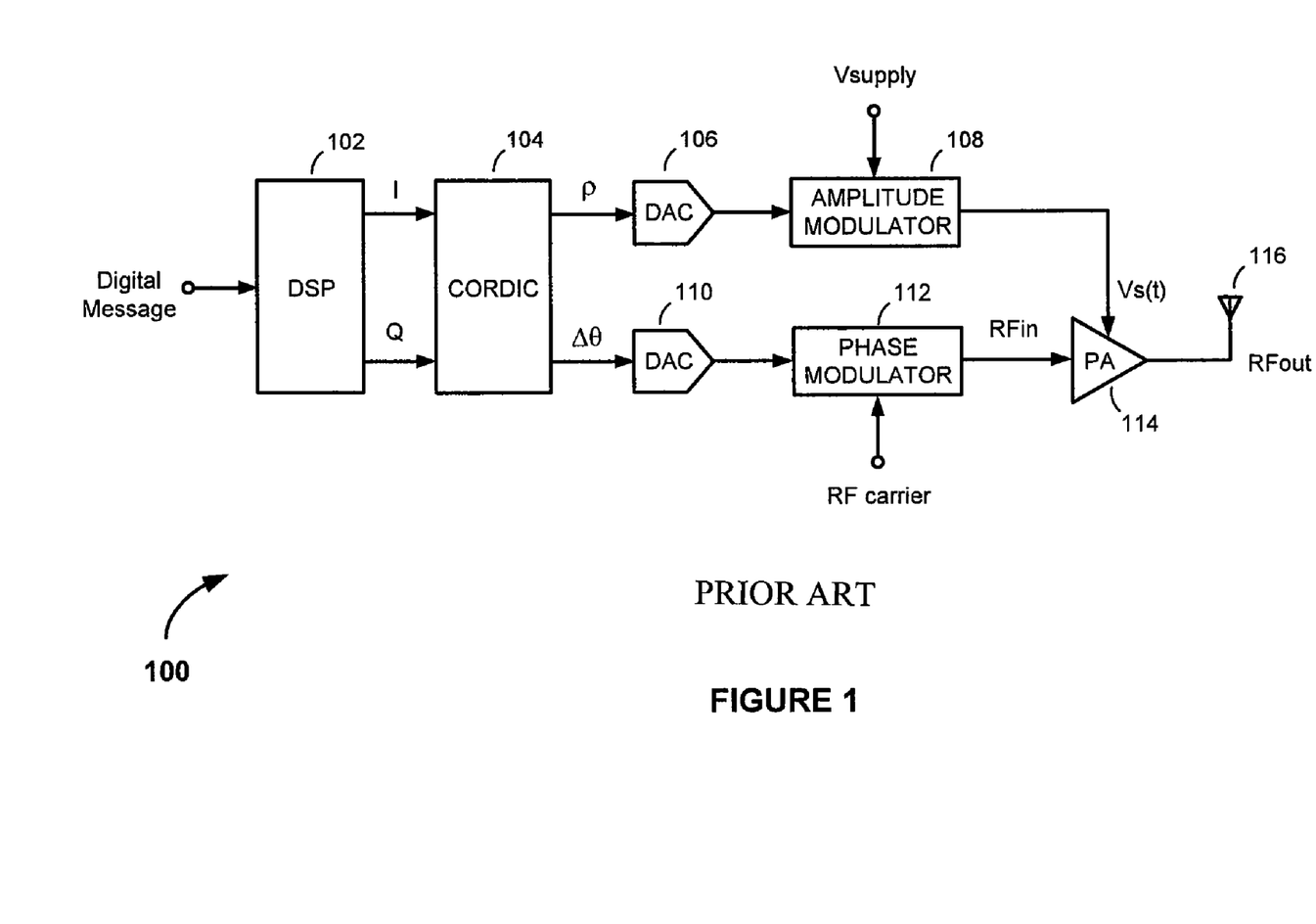
FIG. 1 is a simplified drawing of a conventional polar transmitter.

FIG. 1 is a drawing showing the basic elements of a polar transmitter 100. The polar transmitter 100 includes a digital signal processor (DSP) 102; a Coordinate Rotation Digital Computer (CORDIC) converter 104; an amplitude modulation (AM) path including a first digital-to-analog converter (DAC) 106 and an amplitude modulator 108; a phase modulation (PM) path including a second DAC 110 and a phase modulator 112; a PA 114; and an antenna 116.

The DSP 102 operates to generate rectangular-coordinate in-phase and quadrature phase (i.e., I and Q) signals from bits in a digital message to be transmitted. The DSP 102 formats the I and Q signals in accordance with a predetermined modulation scheme, pulse-shapes the I and Q signals to reduce signal bandwidth, and then couples the pulse-shaped I and Q signals to inputs of the CORDIC converter 104. The CORDIC converter 104 converts the pulse-shaped I and Q signals into a digital amplitude component signal ρ representing the envelope of the modulation and a digital phase component signal Δθ representing the sample time by sample time phase difference of the modulation.

The first and second DACs 106 and 110 convert the digital amplitude and phase component signals ρ and Δθ into analog amplitude and phase difference modulation signals, which are coupled to inputs of the amplitude modulator 108 and the phase modulator 112, respectively. The amplitude modulator 108 operates to modulate a DC power supply Vsupply according to amplitude variations in the analog amplitude modulation signal, to generate an amplitude-modulated power supply signal Vs(t), which is coupled to the power supply port of the PA 114. Meanwhile, the phase modulator 112 operates to modulate an RF carrier signal according to the changes in phase in the analog phase difference modulation signal, to generate a phase-modulated RF carrier signal RFin, which is coupled to the RF input port of the PA 114.

Because the phase-modulated RF carrier signal RFin has a constant envelope, the PA 114 can be configured to operate in its nonlinear region of operation without the risk of signal peak clipping. Typically, the PA 114 is implemented as a Class D, E or F switch-mode PA 114 operating between compressed and cut-off states, so that the output power of the PA 114 is directly controlled and modulated according to the amplitude variations in the amplitude-modulated power supply signal Vs(t). By modulating the power supply port of the PA 114 in this manner, the amplitude modulation represented in the original digital amplitude component signal ρ is restored at the output of the PA 114, as the PA 114 amplifies the phase-modulated RF carrier signal RFin.

Figure 2:
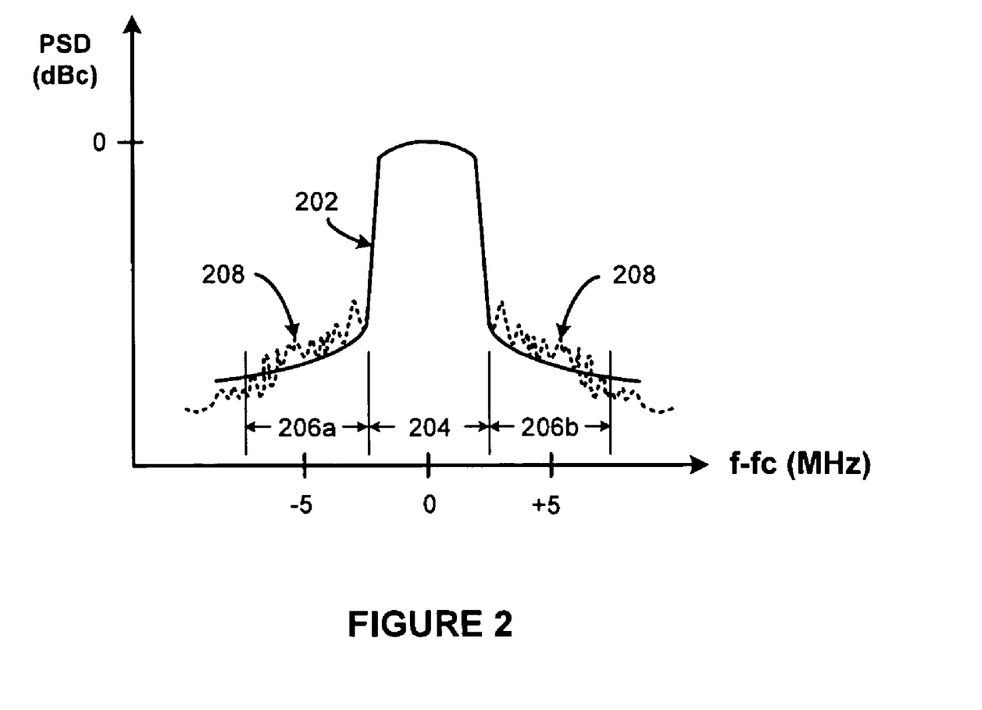
FIG. 2 is a drawing illustrating how the power spectral density at the output of a communications transmitter is typically required to fall below a spectral mask specified by a wireless communications standard.

Although the polar transmitter 100 is capable of processing and transmitting nonconstant-envelope signals at high efficiencies, recomposition of the AM and PM information at the output of the PA 114 can be difficult due to the fact that the AM and PM are processed independently, i.e., in the separate AM and PM paths. The different levels of signal processing and difference in delays presented to signals in the AM and PM paths results in a misalignment (i.e., a delay mismatch) of the signals arriving at the power supply and RF input ports of the PA 114. Failure to reduce the delay mismatch degrades the modulation accuracy of the polar transmitter 100 and undesirably leads to the generation of out-of-band signal energy at the output of the PA 114, making it difficult, or in some cases even impossible, to comply with communications standards. For example, in transmitters configured to operate in according with the W-CDMA air interface in a Universal Mobile Telecommunications System (UMTS), compliance in adjacent channels 206a and 206b requires that the power spectral density (PSD) of the output of the transmitter's PA fall below a spectral mask 202, as illustrated in FIG. 2. The energy generated by the polar transmitter 100 in adjacent channels 206a and 206b increases as the delay mismatch increases. If the delay mismatch is too high, the spectral mask requirements cannot be satisfied.

The amount of delay mismatch between the AM and PM paths of the polar transmitter 100 that may be tolerated in any given application depends on the type of modulation being employed. For example, in Enhanced Data Rates for Global System for Mobile Communications (GSM) Evolution (EDGE) systems, a delay mismatch of up to about 10 ns may be tolerable. However, in wideband modulation systems, such as in W-CDMA systems, where higher clock rates are required to preserve the much wider modulation signal bandwidths, the delay mismatch should be reduced to 1 ns or less.

Delay mismatch in the polar transmitter 100 is also affected by integrated circuit process, voltage and temperature (PVT) variations. In narrowband applications such as GSM and EDGE, PVT variations on delay mismatch are small enough that they can be either ignored or compensated for by inserting a fixed compensating delay in either of the AM or PM paths during a preoperational mode calibration process performed during initial system setup. In wideband applications, however, such as W-CDMA and next-generation wideband applications, the PVT variations are strong enough that they can neither be ignored nor sufficiently compensated for in preoperational mode calibration processes.

It would be desirable, therefore, to have methods and apparatus for dynamically monitoring and adaptively reducing the delay mismatch between the AM and PM paths of a polar transmitter.

SUMMARY OF THE INVENTION

Methods and apparatus for adaptively aligning delays in the amplitude modulation (AM) and phase modulation (PM) paths of a polar transmitter are disclosed. An exemplary polar transmitter includes a power amplifier (PA), an AM path including an AM path adjustable delay, an AM path delay measurement circuit, a PM path including a PM path adjustable delay, and a PM path delay measurement circuit. The AM path delay measurement circuit is configured to measure an AM path delay using waveform correlation, which in one embodiment includes sensing peak magnitude events (PMEs) in signals transmitted along the AM path to a power supply port of the PA. The PM path delay measurement circuit is configured to measure a PM path delay also using waveform correlation, which in one embodiment includes sensing PMEs in signals transmitted along the PM path to a phase-modulated input of the PA. The measured AM and PM path delays are used to adjust the AM and PM path adjustable delays, to reduce the delay mismatch between signals appearing at the power supply and phase-modulated input ports of the polar transmitter's PA.

According to one embodiment, the polar transmitter includes a digital delay comparator, and the AM and PM path delay measurement circuits each includes a clock generator and a period-to-digital converter (PDC). The clock generator and PDC of the AM path delay measurement circuit operate to generate an AM path digital word indicative of the AM path delay. Similarly, the clock generator and PDC of the PM path delay measurement circuit operate to generate a PM path digital word indicative of the PM path delay. The digital comparator operates to compare the AM path digital word to the PM path digital word and adjust the AM path adjustable delay relative to the PM path adjustable delay depending on a result of the comparison, thereby reducing the delay mismatch between the signals applied to the power supply and phase-modulated input ports of the polar transmitter's PA.

In another embodiment, the polar transmitter includes a phase-frequency detector. AM path and PM path delay clocks are generated by AM path and PM path clock generators, in response to PMEs in AM and PM signals in the AM and PM paths, respectively. The phase-frequency detector operates to reduce the phase and/or frequency difference between the AM and PM path delay clocks, and in so doing generates delay control signals for the AM path and PM path adjustable delays, to reduce the delay mismatch between the signals applied to the power supply and phase-modulated input ports of the polar transmitter's PA.

The time alignment methods of the present invention are performed at baseband, adaptively and in real time so that frequency-related, PVT-related and other time-dependent delay effects on the delay alignment of the AM and PM paths are accounted for as the polar transmitter operates.

Further features and advantages of the present invention, including a description of the structure and operation of the above-summarized and other exemplary embodiments of the invention, are described in detail below with respect to accompanying drawings, in which like reference numbers are used to indicate identical or functionally similar elements.

DETAILED DESCRIPTION

Figure 3:
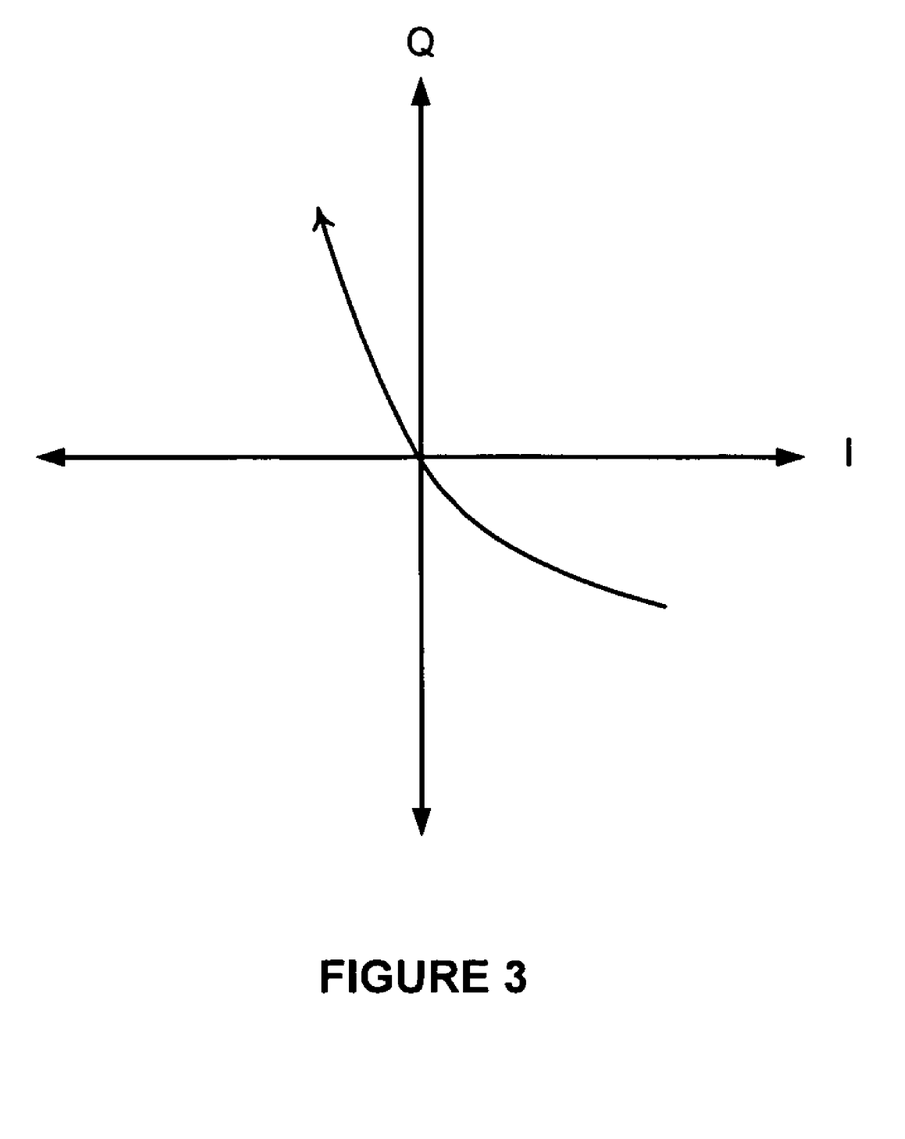
FIG. 3 is a complex in-phase (I) and quadrature (Q) phase signal graph, illustrating how nonconstant-envelope modulation schemes can produce nonconsant-envelope modulation signal trajectories that pass through or close to the origin.

The present invention is applicable to polar transmitter methods and apparatus configured to operate in accordance with nonconstant-envelope modulation schemes that produce nonconsant-envelope modulation signals having trajectories that pass through or close to the origin in the complex in-phase and quadrature phase (I-Q) signal plane, as illustrated in FIG. 3. For example, the invention is applicable to third generation Wideband Code Division Multiple Access (W-CDMA) cellular communication modulation schemes, orthogonal frequency-division multiple access (OFDMA) modulation schemes employed in wireless metropolitan area networks (WiMAX) and the soon to be deployed fourth generation Long Term Evolution (LTE) Universal Mobile Telecommunications System (UMTS) upgrade (i.e., High Speed OFDM Packet Access (HSOPA)), and other nonconstant-envelope modulation schemes producing signal trajectories passing through or close to the origin in the I-Q signal plane, particularly those nonconstant-envelope modulation schemes having a high peak-to-average ratio (PAR). Although the exemplary embodiments set forth below are described in the context of wireless cellular communications, the invention is not so limited and is applicable to cellular or non-cellular communications applications and to wired (including fiber optic) or wireless communications applications.

Figure 4:
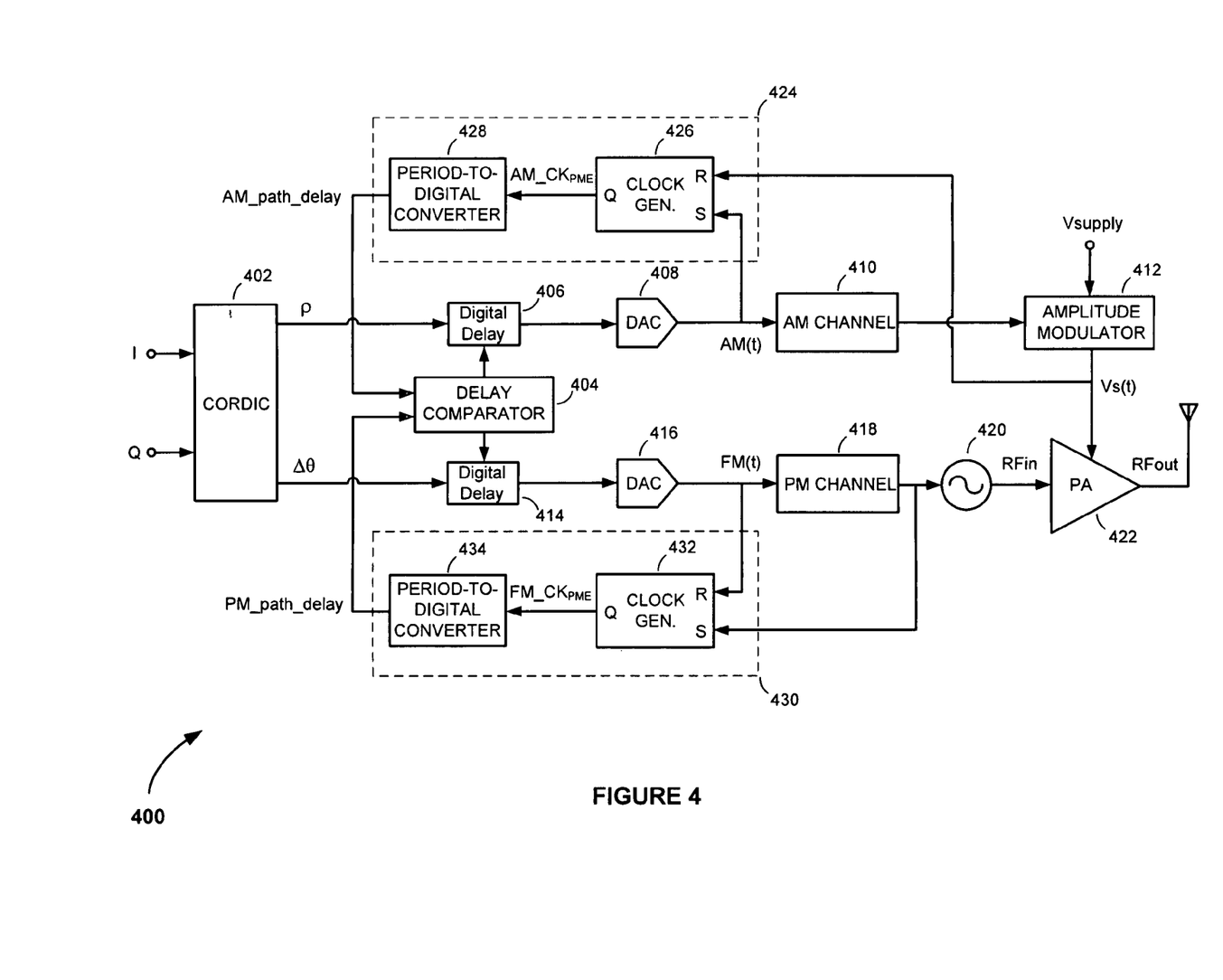
FIG. 4 is a drawing of a polar transmitter according to an embodiment of the present invention.

Referring now to FIG. 4, there is shown a drawing of a polar transmitter 400 according to an embodiment of the present invention. The polar transmitter 400 comprises a Coordinate Rotation Digital Computer (CORDIC) converter 402; a digital delay comparator 404; an amplitude modulation (AM) path including a first digital delay 406, a first digital-to-analog converter (DAC) 408, an AM channel block 410 and an amplitude modulator 412 (e.g., a linear regulator or a switching regulator); a phase modulation (PM) path including a second digital delay 414, a second DAC 416, a PM channel block 418 and a radio frequency (RF) oscillator 420; an RF power amplifier (PA) 422, such as a switch-mode RF PA; an AM path delay measurement circuit 424 including a first clock generator 426 and a first period-to-digital (PDC) converter 428; and a PM path delay measurement circuit 430 including a second clock generator 432 and a second PDC 434.

During operation, a symbol generator and pulse shaping filter (not shown in the drawing) generate I and Q signals modulated according to a predetermined nonconstant-envelope digital modulation scheme. The CORDIC converter 402 operates to convert the pulse-shaped I and Q signals into a digital amplitude component signal ρ representing the envelope of the modulation and a digital phase difference component signal Δθ representing the modulation phase difference.

The digital amplitude component signal ρ and the digital phase difference component signal Δθ are delayed by the first and second digital delays 406 and 414, depending on delay control signals provided by the digital delay comparator 404. The first and second digital delays 406 and 414 may be implemented using digital registers, digital filters, or other suitable digital delay circuits, as will be appreciated by those of ordinary skill in the art.

As explained in more detail below, as the polar transmitter 400 operates in real time, the delays of the AM and PM paths are continuously monitored and measured by the AM and PM path delay measurement circuits 424 and 430. The digital delay comparator 404 responds to the measured AM path and PM path delays by adaptively controlling the delays presented by the first and second digital delays 406 and 414, so that timing misalignment between the signal applied to the radio frequency (RF) input port (RFin) and the signal applied to the power supply port (Vs(t)) of the PA 422 is minimized.

The first and second DACs 408 and 416 convert the delayed digital amplitude component signal ρ and the delayed digital phase component signal Δθ into an analog amplitude modulation signal AM(t) and an analog frequency modulation signal FM(t), respectively. The analog amplitude modulation signal AM(t) is coupled to the input of the AM channel block 410, while the analog frequency modulation signal FM(t) is coupled to the input of the PM channel block 418. The AM channel and PM channel blocks 410 and 418 are used in a generic sense here, to indicate that the AM and PM paths may incorporate a variety of different design possibilities. Typically, AM and PM channel blocks 410 and 418 include components such as reconstruction filters and analog scaling and offset circuits. The PM channel block 418, in the exemplary embodiment in FIG. 4 includes a frequency synthesizer for controlling the RF oscillator 420. Together the frequency synthesizer and RF oscillator 420 function as a phase modulator that generates a phase-modulated RF carrier signal RFin from the frequency modulation information in the analog frequency modulation signal FM(t).

It should also be pointed out that, while the amplitude and phase modulators in the AM and PM paths are shown in FIG. 4 as being controlled by analog signals (AM(t) and FM(t)), designs employing digitally controlled amplitude and phase modulators may alternatively be used. Further, although not shown in the drawing in FIG. 4, the AM and PM paths may also include additional digital circuitry between the CORDIC converter 404 and the first and second DACs 408 and 416, such as digital filters, digital data rate converters, digital AM-AM and AM-PM predistorters, etc. The adaptive time alignment methods and apparatus of the present invention described below are applicable to any number of these and other AM and PM path design possibilities; but they are not limited to application in any particular design, as those of ordinary skill in the art will appreciate and understand with the benefit of this disclosure.

Figure 5A:
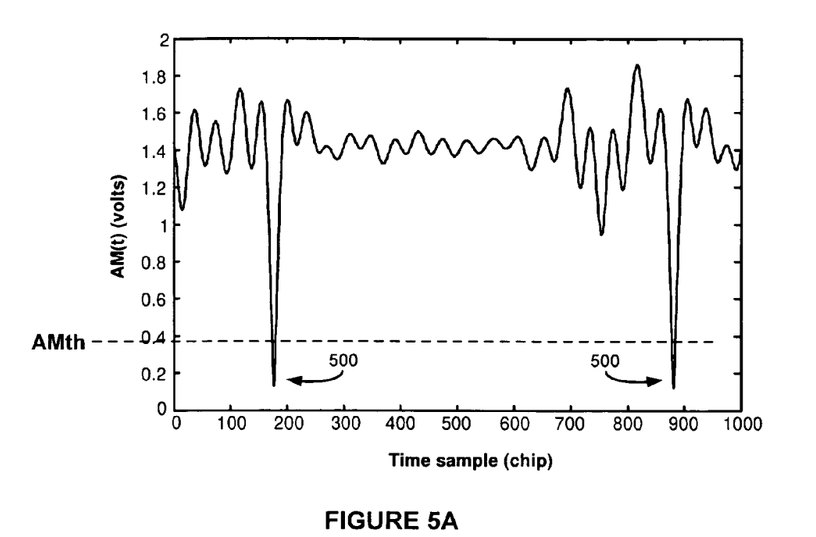
FIG. 5A is a graph of an exemplary analog amplitude modulation signal AM(t) as a function of time samples.
Figure 5B:
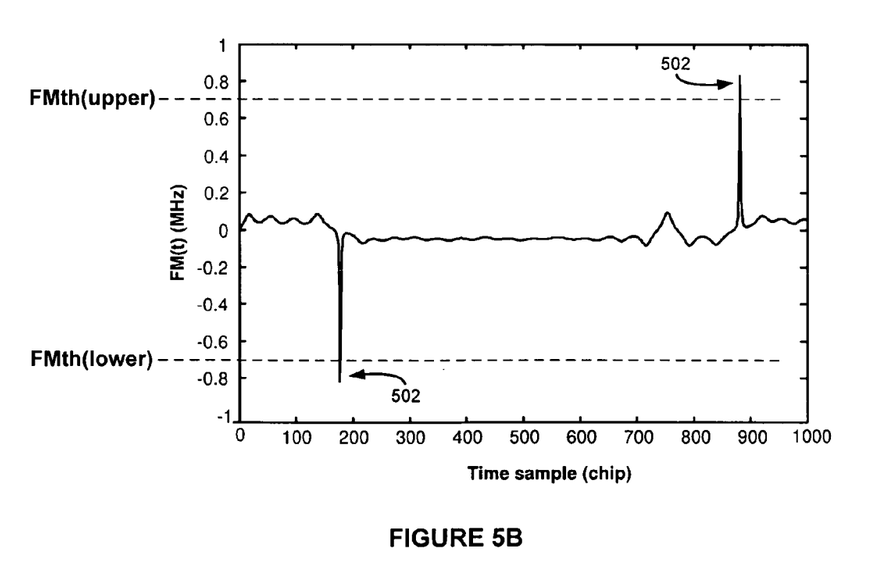
FIG. 5B is a graph of an exemplary analog frequency modulation signal FM(t) as a function of time samples.

The time alignment methods and apparatus of the present invention, which will now be described in detail, use waveform correlation principles to measure AM and/or PM path delays. In the exemplary embodiments that follow, waveform correlation is achieved by sensing the occurrence of what will be referred to as "peak magnitude events" (PMEs) in the analog amplitude modulation and/or analog frequency modulation signals AM(t) and FM(t) provided at the outputs of the first and second DACs 408 and 416. PMEs are produced as a result of the analog amplitude modulation and analog frequency modulation signals AM(t) and FM(t) signals being formed from a nonconstant-envelope modulation scheme. Application of the nonconstant-envelope modulation scheme results in the analog amplitude modulation and analog frequency modulation signals AM(t) and FM(t) having signal trajectories passing through (or very close to) the origin in the complex I-Q signal plane (as in FIG. 3). The PMEs 500 and 502 are revealed in the analog amplitude modulation and analog frequency modulation signals AM(t) and FM(t), similar to as shown in FIGS. 5A and 5B. While PMEs are used in the exemplary embodiments described herein, other types of events and/or waveform characteristics in the AM(t) and/or FM(t) signals (or in the digital signals from which they derive) may be used in the waveform correlation, as will be appreciated by those of ordinary skill in the art with the benefit of this disclosure.

FIG. 5A is a graph of an exemplary analog amplitude modulation signal AM(t) as a function of time samples (e.g., chips). Notice that because a nonconstant-envelope modulation scheme is being used, the analog amplitude modulation signal AM(t) has a nonconstant envelope. PMEs 500 are seen to occur near the $200^{th}$ and $900^{th}$ time samples. These PMEs 500 correspond to a signal trajectory in the I-Q signal plane that passes through (or very close to) the origin.

FIG. 5B is a graph of an exemplary analog frequency modulation signal FM(t) as a function of time samples (e.g., chips). It is seen that the phase difference of the signal experiences PMEs 502 of roughly +180 or −180°, and that the PMEs 502 occur at correspondingly the same times as the PMEs 500 in the analog amplitude modulation signal AM(t).

Figure 6:
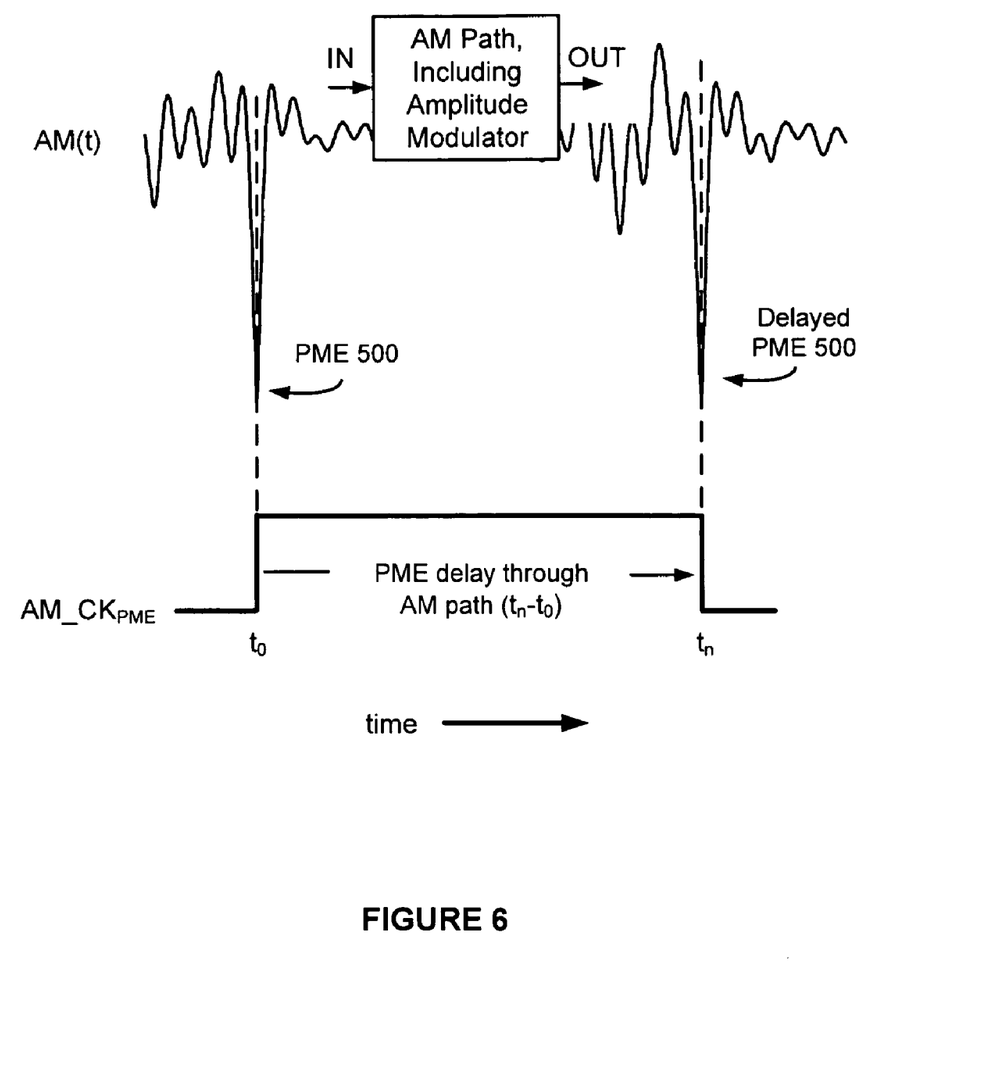
FIG. 6 is a diagram showing that the time $t_n$-$t_0$ between rising and falling edges of an AM path delay clock AM_CK$_{PME}$ generated by an AM path clock generator of the polar transmitter in FIG. 4 provides an indication of the AM path delay of the polar transmitter.

According to one aspect of the invention, the PMEs 500 in the analog amplitude modulation signal AM(t) are used by the AM path delay measurement circuit 424 to measure the AM path delay, and the PMEs 502 in the analog frequency modulation signal FM(t) are used by the PM path delay measurement circuit 430 to measure the PM path delay. In measuring the AM and PM path delays, the first clock generator 426 is triggered (i.e., is "set") in response to a PME 500 in the analog amplitude modulation signal AM(t). Note that the first and second clock generators 426 and 432 may be formed in a variety of different ways. In this exemplary embodiment, they are formed from first and second set-reset (S-R) flip-flops. The first clock generator 426 is triggered when the magnitude of the analog amplitude modulation signal AM(t) drops below some predetermined threshold AMth, indicating a PME 500, as illustrated in FIG. 5A. As the same PME 500 propagates through the AM channel block 410 and the amplitude modulator 412 to the power supply port of the PA 422, the Q output of the first clock generator 426 remains in a set state. When the delayed PME 500 arrives at the power supply port of the PA 422, it is used to stop (i.e., "reset") the first clock generator 426. This process is repeated on subsequent PMEs 500 in the analog AM(t) signal, to produce an AM path delay clock $AM\_CK_{PME}$ at the Q output of the first clock generator 426. The time $t_n-t_0$ between rising and falling edges of the AM path delay clock $AM\_CK_{PME}$ (see FIG. 6) provides an indication of the delay presented by the AM path to signals that are propagated along the AM path from the output of the first DAC 408 to the power supply port of the PA 422.

Figure 7:
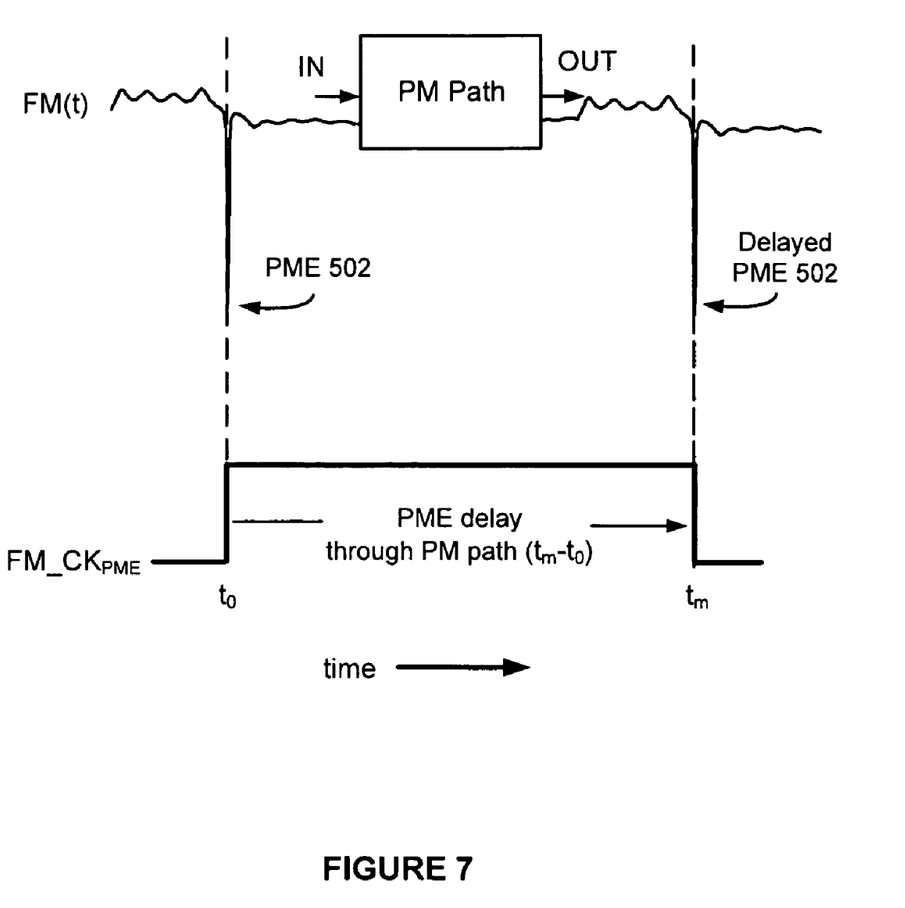
FIG. 7 is a diagram showing that the time $t_n$-$t_0$ between rising and falling edges of a PM path delay clock FM_CK$_{PME}$ generated by a PM path clock generator of the polar transmitter in FIG. 4 provides an indication of the PM path delay of the polar transmitter.

While the first clock generator 426 of the AM path delay measurement circuit 424 is responding to PMEs 500 in the analog amplitude modulation signal AM(t), the second clock generator 432 of the PM path delay measurement circuit 430 responds to PMEs 502 in the analog frequency modulation signal FM(t), to produce a PM path delay clock $FM\_CK_{PME}$ at the Q output of the second clock generator 432. Because the PMEs 502 in the analog frequency modulation signal FM(t) can be either positive or negative (see FIG. 5B), the second clock generator 432 is configured to trigger whenever the PMEs rise above or fall below upper and lower thresholds FMth(upper) and FMth(lower). As shown in FIG. 7, the time $t_m-t_0$ between rising and falling edges of the PM path delay clock $FM\_CK_{PME}$ provides an indication of the delay presented to signals that are propagated along the PM path from the output of the second DAC 416 to the RF input port of the PA 422. Note that the delay through the RF oscillator 420 is small and is therefore neglected in the measurement of the signal delay through the PM path.

After the first and second clock generators 426 and 432 have generated the AM path delay and PM path delay clocks $AM\_CK_{PME}$ and $FM\_CK_{PME}$, the clocks are coupled to inputs of the first and second PDCs 428 and 434, which operate to generate digital words AM path delay and PM path delay representing the delays $t_n-t_0$ and $t_m-t_0$ through the AM and PM paths, respectively. The first and second PDCs 428 and 434 may be implemented in various ways. Some exemplary PDCs that may be used are described in U.S. Pat. No. 7,095,353 to Sander et al., which is hereby incorporated by reference.

Figure 8A:
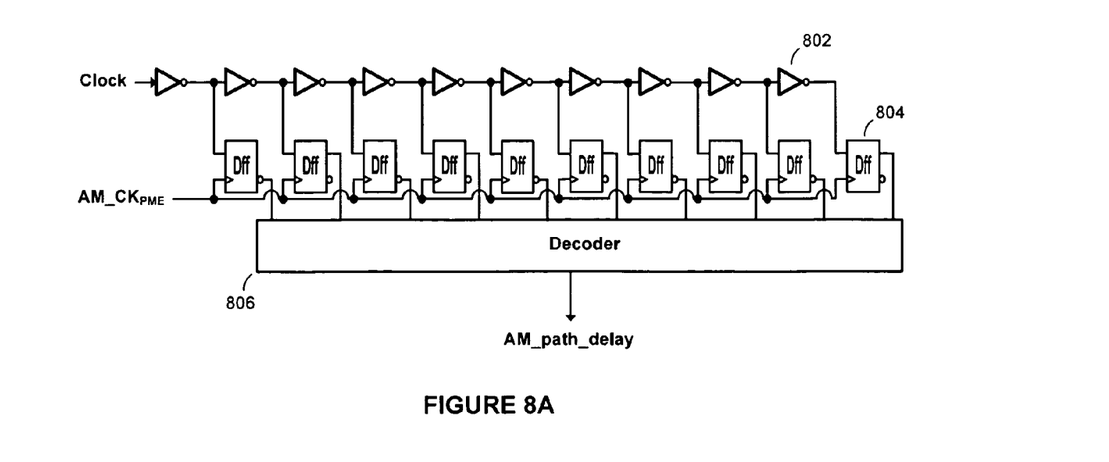
FIG. 8A is a drawing of a polyphase period-to-digital converter (PDC) that may be used to implement the AM path and PM path PDCs of the AM path and PM path delay measurement circuits of the polar transmitter in FIG. 4.
Figure 8B:
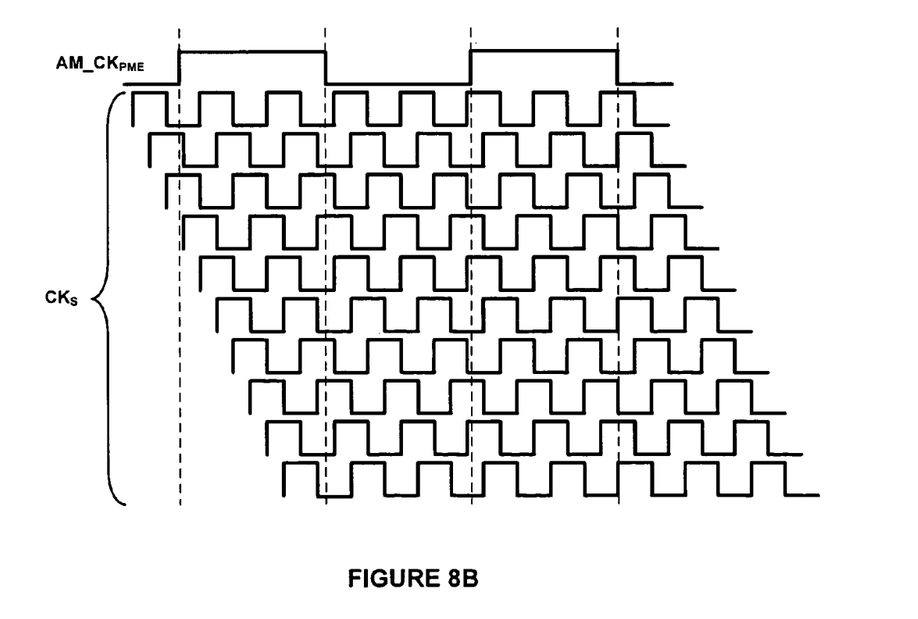
FIG. 8B is timing diagram showing the phase relationships among the various phases of the polyphase sampling clock CKs used by the polyphase PDC in FIG. 8A.

FIG. 8A is a drawing of another PDC that may be used. The PDC includes a plurality of NOT gates 802, a plurality of D flip-flops 804 and a decoder 806. When used to implement the first PDC 428 of the polar transmitter 400 in FIG. 4, the plurality of inverters 802 operates to generate a polyphase sampling clock CKs having a plurality of phases (shown in FIG. 8B) from a reference clock "Clock". Use of the polyphase sampling clock CKs to perform the sampling of the AM path delay clock $AM\_CK_{PME}$ allows the period-to-digital conversion process to be performed at high accuracy and avoids having to generate and use a single sampling clock of much higher frequency to achieve the same level of accuracy. The D flip-flops 804 operate to sample the AM path delay clock $AM\_CK_{PME}$ according to the different phases of the polyphase sampling clock CKs. The resulting samples provide an indication of how the rising and falling edges in the AM path delay clock $AM\_CK_{PME}$ are distributed in relation to the various phases of the polyphase sampling clock CKs. The decoder 806 determines which phases of the polyphase sampling clock CKs are most closely aligned with the detected rising and falling edges of the AM path delay clock $AM\_CK_{PME}$ and generates a digital word AM_path_delay indicative of the delay $t_n-t_0$ through the AM path. A similar PDC 434 is used to generate a digital word PM_path_delay indicative of the delay $t_m-t_0$ through the PM path.

The digital word AM path delay measured by the AM path delay measurement circuit 424 provides a digital measure of the absolute delay $t_n-t_0$ experienced by signals propagated along the AM path from the output of the first DAC 408 to the power supply port of the PA 422. Similarly, the digital word PM_path_delay measured by the PM path delay measurement circuit 430 provides a digital measure of the absolute delay $t_m-t_0$ experienced by signals propagated along the PM path from the output of the second DAC 416 to the RF input port of the PA 422. The digital words AM path delay and PM path delay are coupled to first and second inputs of the digital delay comparator 404, which responds by adjusting either or both of the first and second digital delays 406 and 414 to reduce the delay mismatch between the amplitude-modulated power supply signal Vs(t) applied to the power supply port of the PA 422 and the phase-modulated RF carrier signal RFin applied to the RF input port of the PA 422. The above process is repeated continuously as the polar transmitter 400 operates, even after calibration and initial system setup. In other words, the process is performed adaptively and in real time so that frequency-related, PVT-related and other time-dependent delay effects on the delay alignment of the AM and PM paths are accounted for as the polar transmitter 400 operates.

While the delays provided by the first and second digital delays 406 and 414 in the exemplary embodiment above are digitally implemented, they may be alternatively implemented using analog delay components, e.g., by implementing the delays with analog delay circuitry or analog delay lines after the first and second DACs 406 and 412 in the AM and PM paths, as will be appreciated and understood by those of ordinary skill in the art with the benefit of this disclosure.

Figure 9:
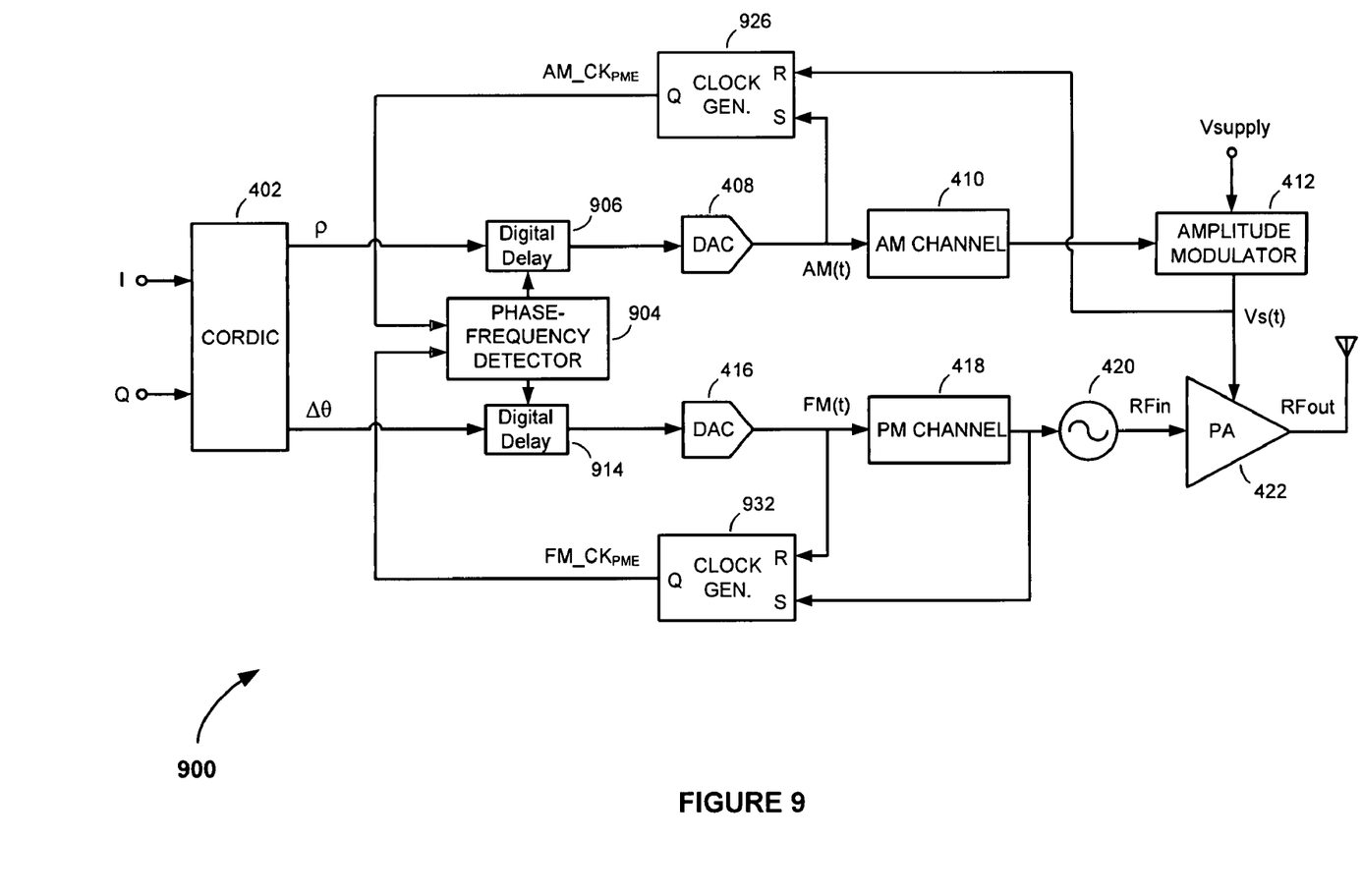
FIG. 9 is a drawing of a polar transmitter according to another embodiment of the invention.

FIG. 9 shows a polar transmitter 900 according to another embodiment of the present invention. The polar transmitter 900 in FIG. 9 includes first and second clock generators 926 and 932, which, similar to the first and second clock generators 426 and 432 of the polar transmitter 400 in FIG. 4, operate to generate an AM path delay clock AM_$CK_{PME}$ and a PM path delay clock FM_$CK_{PME}$, respectively. In this embodiment, instead of generating digital words AM path delay and PM path delay representing the delays $t_n$-$t_0$ and $t_m$-$t_0$ through the AM and PM paths, the AM path delay and PM path delay clocks AM_$CK_{PME}$ and FM_$CK_{PME}$ are fed to a digital phase-frequency detector 904. The digital phase-frequency detector 904 may be implemented in a variety of different ways. One implementation that may be adapted for use here is shown and described in U.S. Pat. No. 4,267,514, which is incorporated herein by reference.

The digital phase-frequency detector 904 operates to generate up and down output signals, depending on the phase relationship between the AM path delay and PM path delay clocks AM_$CK_{PME}$ and FM_$CK_{PME}$. Specifically, when the AM path delay clock AM_$CK_{PME}$ leads the PM path delay clock FM_$CK_{PME}$, indicating that the delay of PMEs 500 through the AM path is less than the delay of PMEs 502 through the PM path, the up output signal of the phase-frequency detector 904 increases relative to the down output signal. This causes the first digital delay 906 in the AM path to increase its delay compared to the delay provided by the second digital delay 914 in the PM path, so that the delay in the AM path is increased compared to the delay in the PM path. This delay adjustment results in a reduction in the delay mismatch between the amplitude-modulated power supply signal Vs(t) and the phase-modulated RF carrier signal RFin at the power supply and RF input ports of the PA 422. Conversely, when the AM path delay clock AM_$CK_{PME}$ lags the PM path delay clock FM_$CK_{PME}$, indicating that the delay of PMEs 500 through the AM path is greater than the delay of PMEs 502 through the PM path, the up output signal of the phase-frequency detector 904 is decreased relative to the down output signal.

The phase-frequency detector 904 performs the above process continuously, i.e., in real time, reducing the phase difference between the AM path delay and PM path delay clocks AM_$CK_{PME}$ and FM_$CK_{PME}$ and, at the same time, controlling the delays presented by the first and second digital delays 906 and 914, so that the delay mismatch between the amplitude-modulated power supply signal Vs(t) applied to the power supply port of the PA 422 and the phase-modulated RF carrier signal RFin applied to the RF input port of the PA 422 is minimized. Similar to the polar transmitter 400 in FIG. 4, the delay alignment process is performed adaptively and in real time so that frequency-related, PVT-related and other time-dependent delay effects on the delay alignment of the AM and PM paths are accounted for as the polar transmitter 900 operates.

Although the present invention has been described with reference to specific embodiments, these embodiments are merely illustrative and not restrictive of the present invention. Further, various modifications or changes to the specifically disclosed exemplary embodiments will be suggested to persons skilled in the art and are to be included within the spirit and purview of this application and scope of the appended claims.

What is claimed is:

1. A polar transmitter, comprising:
a power amplifier (PA);
an amplitude modulation (AM) path including an AM path adjustable delay;
an AM path delay measurement circuit coupled to said AM path configured to measure correlation in a signal transmitted along said AM path to a power supply port of said PA;
a phase modulation (PM) path including a PM path adjustable delay; and
a PM path delay measurement circuit coupled to said PM path configured to measure correlation in a signal transmitted along said PM path to a phase-modulated input port of said PA, wherein
measuring correlation in the signal transmitted along said PM path comprises sensing a peak magnitude event (PME) in the signal transmitted along said PM path.

2. The polar transmitter of claim 1 wherein measuring correlation in the signal transmitted along said AM path comprises sensing a peak magnitude event (PME) in the signal transmitted along said AM path.

3. The polar transmitter of claim 1, further comprising a delay comparator configured to compare the measured AM path delay to the PM path delay and generate a delay control signal or signals that controls or control said AM path adjustable delay relative to said PM path adjustable delay, to reduce a delay mismatch between said signals applied to the power supply and phase-modulated input ports of said PA.

4. The polar transmitter of claim 1 wherein:
said AM path delay measurement circuit comprises an AM path clock generator configured to generate an AM path delay clock that provides an indication of the delay presented to the signal transmitted along said AM path to the power supply port of said PA; and
said PM path delay measurement circuit comprises a PM path clock generator configured to generate a PM path delay clock that provides an indication of the delay presented to the signal transmitted along said PM path to the phase-modulated input port of said PA.

5. The polar transmitter of claim 4 wherein:
said AM path delay measurement circuit further comprises an AM path period-to-digital converter (PDC) configured to generate an AM path digital word from the AM path delay clock, said AM path digital word providing a digital representation of the AM path delay; and
said PM path delay measurement circuit further comprises a PM path PDC configured to generate a PM path digital word from the PM path delay clock, said PM path digital word providing a digital representation of the PM path delay.

6. The polar transmitter of claim 1 wherein said AM path delay measurement circuit comprises a clock generator configured to generate an AM path delay clock that provides an indication of the delay presented to the signal transmitted along said AM path to the power supply port of said PA.

7. The polar transmitter of claim 6 wherein said AM path delay measurement circuit further comprises a period-to-digital converter configured to generate a digital word from the AM path delay clock generated by said clock generator, said digital word providing a digital representation of the AM path delay.

8. A polar transmitter, comprising:
a power amplifier (PA);
an amplitude modulation (AM) path including an AM path adjustable delay;

an AM path clock generator configured to generate an AM path delay clock from events in an AM path signal, the AM path signal being a signal transmitted along said AM path to a power supply port of said PA;
a phase modulation (PM) path including a PM path adjustable delay; and
a PM path clock generator configured to generate a PM path delay clock from events in a PM path signal, the PM path signal being a signal transmitted along said PM path to a phase-modulated input port of said PA.

9. The polar transmitter of claim 8 wherein the events in the signal transmitted along said AM path comprise peak magnitude events in the AM path signal.

10. The polar transmitter of claim 8, further comprising a circuit configured to receive the AM path and PM path delay clocks and generate therefrom one or more delay control signals for controlling said AM path adjustable delay relative to said PM path adjustable delay.

11. The polar transmitter of claim 10 wherein said circuit comprises a phase-frequency detector operable to reduce a phase and/or frequency difference between the AM path and PM path delay clocks.

12. The polar transmitter of claim 8, further comprising:
an AM path period-to-digital converter (PDC) configured to generate an AM path digital word from said AM path delay clock;
a PM path PDC configured to generate a PM path digital word from said PM path delay clock; and
a digital comparator configured to compare the AM path digital word to the PM path digital word and adjust the AM path adjustable delay relative to the PM path adjustable delay depending on a result of the comparison.

13. A polar transmitter, comprising:
an amplitude modulation (AM) path;
a phase modulation (PM) path;
means for controlling a delay presented to a signal transmitted along said AM path relative to a delay of a signal transmitted along said PM path in either said signal transmitted along the AM path or said signal transmitted along the PM path or in both of said signal transmitted along the AM path and said signal transmitted along the PM path; and
means for estimating the PM path delay comprising sensing a peak magnitude event (PME) in the signal transmitted along said PM path.

14. A method of reducing a delay mismatch between an AM path signal and a PM path signal, the AM path signal being a signal applied to a power supply port of a power amplifier (PA) in a polar transmitter and the PM path signal being a signal applied to a phase-modulated input port of the PA, comprising:
estimating an amplitude modulation (AM) path delay, within an AM path using events in the AM path signal;
modifying the AM path delay relative to a phase modulation (PM) path delay, within an PM path using the estimated AM path delay, to reduce a delay mismatch between the AM path signal and the PM path signal; and
estimating the PM path delay using events in the PM path signal, wherein
estimating the PM path delay comprises sensing a peak magnitude event (PME) in the signal transmitted along said PM path.

15. The method of claim 14 wherein estimating the AM path delay comprises sensing a peak magnitude event (PME) in the signal transmitted along said AM path.

16. A method of reducing a delay mismatch between an AM path signal and a PM path signal, the AM path signal being a signal applied to a power supply port of a power amplifier (PA) in a polar transmitter and the PM path signal being a signal applied to a phase-modulated input port of the PA, comprising:
estimating an amplitude modulation (AM) path delay, within an AM path using events in the AM path signal;
modifying the AM path delay relative to a phase modulation (PM) path delay, within an PM path using the estimated AM path delay, to reduce said delay mismatch between the AM path signal and the PM path signal; and
estimating the PM path delay using events in the PM path signal, wherein
estimating the AM path delay comprises generating an AM path delay clock using peak magnitude events (PMEs) in the signal transmitted along the AM path; and
estimating the PM path delay comprises generating a PM path delay clock using PMEs in the signal transmitting along the PM path.

17. The method of claim 16 wherein modifying the AM path delay relative to the PM path delay comprises reducing a phase and/or frequency difference between said AM path delay clock and said PM path delay clock.

18. The method of claim 16 wherein:
estimating the AM path delay further comprises generating an AM path digital word from said AM path delay clock; and
estimating the PM path delay further comprises generating a PM path digital word from said PM path delay clock.

19. The method of claim 18 wherein modifying the AM path delay relative to the PM path delay comprises comparing the AM path digital word to the PM path digital word.

20. A method of reducing a delay mismatch between an AM path signal and a PM path signal, the AM path signal being a signal applied to a power supply port of a power amplifier (PA) in a polar transmitter and the PM path signal being a signal applied to a phase-modulated input port of the PA, comprising:
estimating a phase modulation (PM) path delay in the PM path signal of a PM path; and
modifying the PM path delay relative to an amplitude modulation (AM) path delay using the estimated PM path delay, to reduce the delay mismatch between the AM path signal and the PM path signal,
wherein estimating the PM path delay comprises sensing a peak magnitude event (PME) in the signal transmitted along said PM path.

* * * * *